US008333914B2

(12) United States Patent
Pitsch et al.

(10) Patent No.: US 8,333,914 B2
(45) Date of Patent: Dec. 18, 2012

(54) DRY LIQUIDS, AND PROCESSES FOR THEIR PREPARATION

(75) Inventors: Holger Pitsch, Mainhausen (DE); Josef Piroth, Mespelbrunn (DE); Thomas Riedemann, Mömbris (DE); Heike Riedemann, Mömbris (DE); Ann Gray, Hanau (DE); Frank Dieter Huenig, Karlstein (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/093,425

(22) PCT Filed: Nov. 3, 2006

(86) PCT No.: PCT/EP2006/068078

§ 371 (c)(1), (2), (4) Date: Aug. 13, 2008

(87) PCT Pub. No.: WO2007/057308

PCT Pub. Date: May 24, 2007

(65) Prior Publication Data

US 2009/0202835 A1 Aug. 13, 2009

(30) Foreign Application Priority Data

Nov. 16, 2005 (EP) .................................... 05025002

(51) Int. Cl.
*C01B 33/12* (2006.01)
*B01J 13/02* (2006.01)
*A61K 7/16* (2006.01)

(52) U.S. Cl. .................. 264/4; 264/7; 264/12; 424/401; 424/59; 424/63; 428/402.2

(58) Field of Classification Search .................... 424/69, 424/401, 59, 63, 405, 70.1; 502/407, 408; 260/42.15, 42.37; 264/4
See application file for complete search history.

(56) References Cited

U.S. PATENT DOCUMENTS

| | | | |
|---|---|---|---|
| 3,393,155 A | 7/1968 | Schutte et al. | |
| 3,951,824 A | 4/1976 | Maxson et al. | |
| 4,008,170 A | 2/1977 | Allan | |
| 5,342,597 A | 8/1994 | Tunison, III | |
| 2003/0108580 A1* | 6/2003 | Hasenzahl et al. | 424/401 |

(Continued)

FOREIGN PATENT DOCUMENTS

CA 1 197 273 A1 11/1985

(Continued)

OTHER PUBLICATIONS

Ullmann's Encyclopedia of Industrial Chemistry, 5th Edition, vol. 32, pp. 25-26.

(Continued)

*Primary Examiner* — James J Seidleck
*Assistant Examiner* — S. Camilla Pourbohloul
(74) *Attorney, Agent, or Firm* — Smith, Gambrell & Russell, LLP

(57) ABSTRACT

Dry liquids having a particle size distribution (cumulative undersize)

Figure 1:
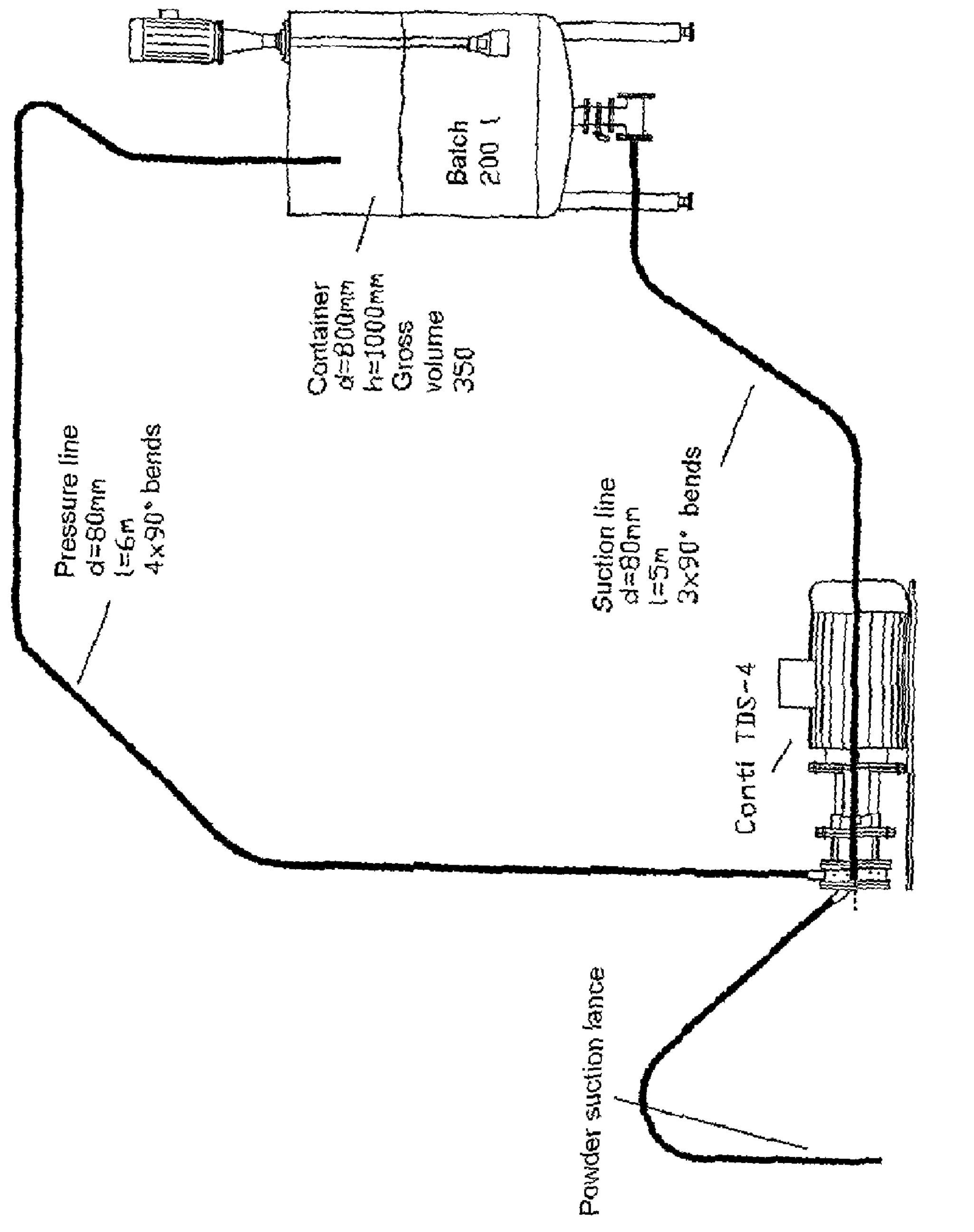

| | |
|---|---|
| D10% | 80 to 140 μm |
| D50% | 140 to 200 μm |
| D90% | 190 to 340 μm |

are prepared by passing the liquids and a hydrophobic, pyrogenically prepared silica through a clearly defined, spatially limited shear zone in which the liquids are broken up into small droplets and are surrounded by the hydrophobic, pyrogenically prepared silica.

8 Claims, 5 Drawing Sheets

U.S. PATENT DOCUMENTS

| | | | | |
|---|---|---|---|---|
| 2004/0028710 | A1 | 2/2004 | Oka | |
| 2005/0233900 | A1 * | 10/2005 | Smith et al. | 502/407 |

FOREIGN PATENT DOCUMENTS

| | | | |
|---|---|---|---|
| EP | 0 478 326 | A | 4/1992 |
| EP | 1 386 599 | A | 2/2004 |
| WO | 92/21436 | A | 12/1992 |
| WO | 01/87474 | A | 11/2001 |

OTHER PUBLICATIONS

International Search Report.

* cited by examiner

Ystral Conti TDS setup with storage container

DRY LIQUIDS, AND PROCESSES FOR THEIR PREPARATION

INTRODUCTION AND BACKGROUND

The invention relates to dry liquids, and a process for their preparation.

Dry liquids, in particular dry water, are disclosed in U.S. Pat. No. 3,393,155.

They consist of pyrogenically prepared silica which has a mean particle size of not more than 50 millimicrons, whose surface has been rendered hydrophobic and which contain from 5 to 10 times the amount of liquid in encapsulated form.

The powder (dry water) has a pulverulent appearance in spite of the large proportion of water.

The known dry powder can be prepared by separating the liquid into fine droplets and mixing these fine droplets with water-repellent, pyrogenically prepared silica with high energy input so that the droplets of the liquid are completely surrounded by the hydrophobic silica (U.S. Pat. No. 3,393,155).

It is furthermore known that a drilling fluid component can be prepared by mixing and combining water with hydrophobic, pyrogenically prepared silica under high shear conditions, a flowable, dry, pulverulent solid product being obtained.

The mixing can be effected under high shear conditions. Thus, a high-speed mixing pump or a disperser can be used in the laboratory.

On a larger scale, a rotating stirrer provided with blades, a mixing pump or any other mixer which is suitable for introducing high shear energy into the mixer can be used (U.S. Pat. No. 3,951,824).

It is furthermore known that dry water can be prepared by stirring silica with water and can be used as a fire extinguishing agent. It can be stored at low temperatures because it does not lose its flowability as a powder even at extremely low temperatures (U.S. Pat. No. 5,342,597 and U.S. Pat. No. 4,008,170).

It is furthermore known that dry water can be prepared by using a "rocking mixer" or a shaking apparatus as apparatuses for the high-speed movement of the mixture (US 2004/0028710).

The known processes have the disadvantage that only relatively small amounts of dry water can be prepared.

It was therefore the object to develop a process by means of which larger amounts of dry water can be prepared.

The invention relates to dry liquids containing a hydrophobic, pyrogenic silica, which is characterized by the following physicochemical parameters:

Particle Size Distribution (Cumulative Undersize)

| | |
|---|---|
| D10% | 80 to 140 μm |
| D50% | 140 to 200 μm |
| D90% | 190 to 340 μm |
| Bulk density DIN 53912 kg/m$^3$ | 400 to 500 |
| Tamped density DIN ISO 787 kg/m$^3$ | 500 to 600 |
| Solids content DIN 53 198% | 4 to 10 |

SUMMARY OF INVENTION

The invention furthermore relates to a process for the preparation of the dry liquids, which is characterized in that the liquids and a hydrophobic, pyrogenically prepared silica are passed through a clearly defined, spatially limited shear zone in which the liquids are broken up into small droplets and are surrounded by the hydrophobic, pyrogenically prepared silica.

The liquids in the hydrophobic, pyrogenically prepared silica can be fed to the shear zone axially, the dry liquids obtained being removed from the shear zone radially.

The liquids and the hydrophobic silica can be fed to the shear zone axially in the same line.

In a further embodiment of the invention, the liquids and the pyrogenically prepared silica can be fed to the shear zone axially in different lines.

In a further embodiment of the invention, the liquid can be mixed with the hydrophobic, pyrogenically prepared silica in a container. This mixture can be fed to the shear zone axially.

The mixture can be aspirated through the apparatus forming the shear zone.

Rotor-stator mixers can be used as the apparatus forming the shear zones. Such a mixer is known, for example, from Ullmann's Encyclopaedia of Industrial Chemistry, 5th Edition, Volume 32, Pages 25-6.

Liquids may be understood as meaning water, aqueous salt solutions, aqueous solutions of glycerol and similar water-miscible liquid components in pharmaceuticals, cosmetics etc.

In a preferred embodiment of the invention, the liquid used may be water.

In an embodiment of the invention, the shear zone may be arranged at the bottom of a conical container. An anchor stirrer which can effect transportation of the hydrophobic pyrogenically prepared silica in such a way that dead zones can be avoided and the total material can be passed through the shear zone may be arranged in the conical container.

In a further embodiment of the invention, the dry liquid produced can be recycled until the total amount of liquid initially introduced is present in the form of the dry liquid.

DETAILED DESCRIPTION OF INVENTION

Example 1

The rotor-stator mixer from Ystral, the Conti TDS was tested in two different setups.

Firstly, an open container having a gross volume of 350 l was connected upstream. The pipeline diameter for connecting the storage container to the Conti TDS is 80 mm both on the suction side and on the pressure side. The length of the suction line is 5 m and said line includes three 90° bends. The length of the pressure line is 6 m with four 90° C. bends.

Figure 2:
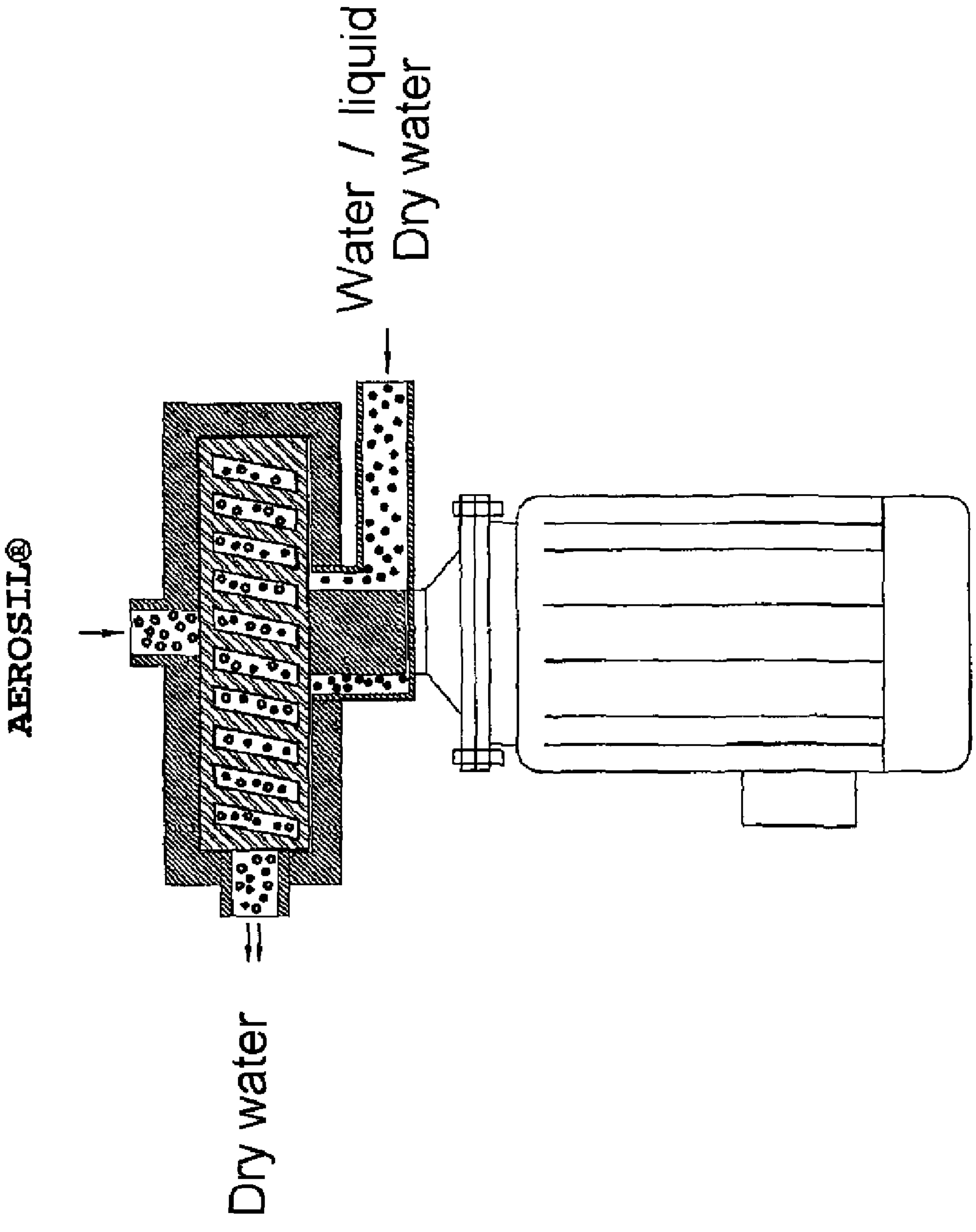

The setup is shown schematically in FIG. 1. The principle of operation of the Ystral Conti TDS is shown schematically in FIG. 2.

The second setup comprised a 60 liter storage container and managed with a suction line length of 2 meters with 2 90° bends and a pressure line of 3 meters with 3 90° bends.

The Conti TDS 4 used was a 37 kW machine. It could be operated at a speed of 3600 rpm which, with the existing size of the mixing chamber with a diameter of 227 mm, led to a circumferential velocity at the inner rotor of 29 m/s and a circumferential velocity at the outer rotor of 31 m/s.

A mixing member, such as, for example, an anchor stirrer, for suppressing the formation of dead zones in the container was present in each case in the storage container.

demineralized water was initially introduced into the storage container. The hydrophobic, pyrogenically prepared silica AEROSIL R812S was provided in an original 10 kg bag, and the required amount was fed directly from the bag by means of a suction lance to the Conti TDS. The reduced pressure generated by the Conti TDS was sufficient for sucking in the AEROSIL within 90 seconds. After the end of the addition, the intake valve was closed and the dispersing was continued until the reaction was complete and the desired quality had been reached.

Example 2

The rotor-stator mixer from A. Berhrents, Becomix MV60, having a container volume of 60 liters and a maximum circumferential velocity of 25 m/s, could also be successfully used. In this setup, the rotor-stator is virtually part of the container. It is mounted directly on the container, in the bottom. Water and the hydrophobic, pyrogenically prepared silica AEROSIL R812S were introduced into the storage container. The rotor-stator mixer present in the bottom aspirated both and recycled the product via a circulation line into the container. The intake power, which is weaker in this system in comparison with example 1, is compensated by virtue of the fact that the rotor-stator was installed directly at the bottom of the container. A stirrer, for example an anchor stirrer, which effectively avoided the formation of dead zones was present in the container. As in example 1, the mixing time depended on the completeness of the reaction and on the desired quality of the dry water.

Figure 3:
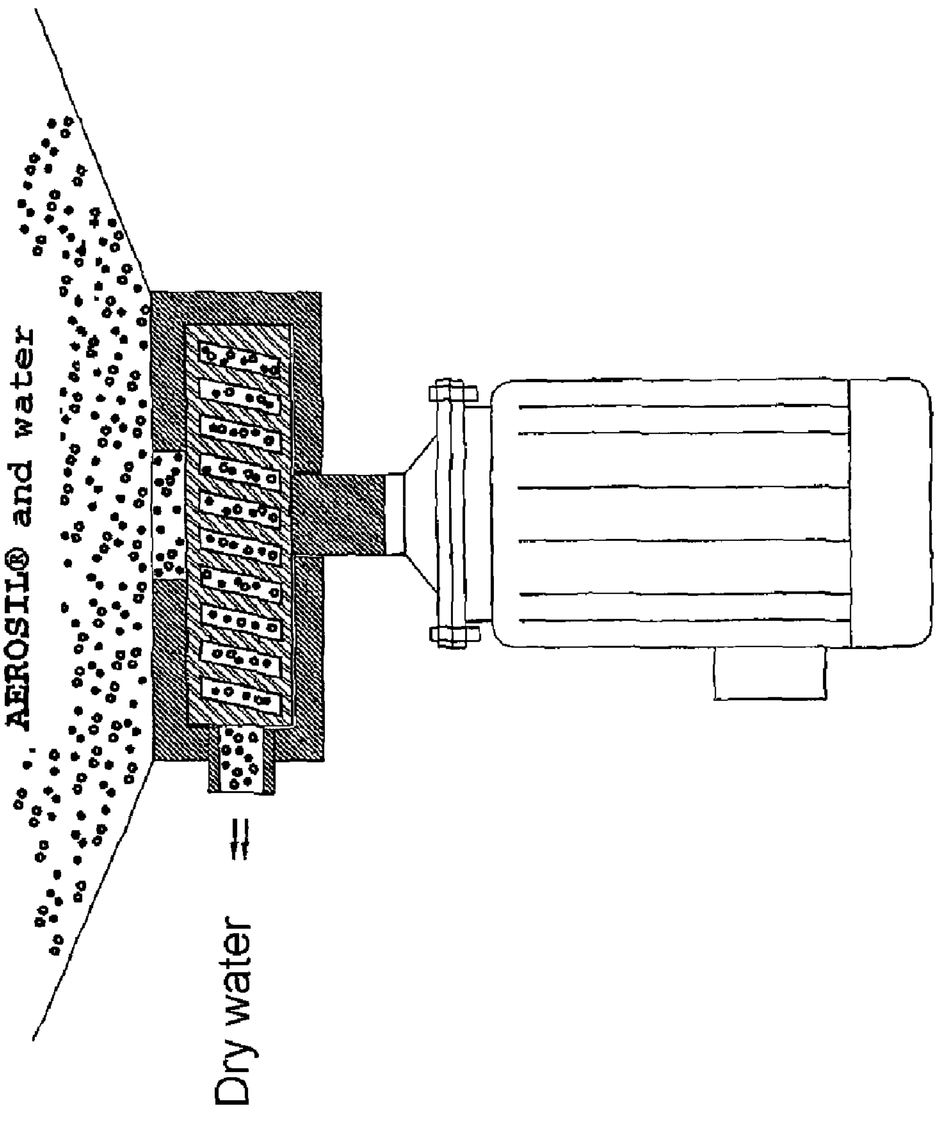

The principle of operation of this arrangement is shown schematically in FIG. 3.

Common to both systems (Ystral and Becomix) is that the liquid and the pyrogenically prepared silica AEROSIL R812S are passed through a clearly defined, spatially limited shear zone in which the liquid is broken up into small droplets and is surrounded by the hydrophobic, pyrogenically prepared silica AEROSIL R812S. This is the substantial difference from the known systems on a laboratory scale. Independently of batch size, container volume and container geometry, the same rotor-stator can always be used under the same conditions. According to the invention, it is always ensured that the complete starting materials are exposed completely to the shear forces during passage through the shear field in the rotor-stator. The difference in the flowability between liquid and "powder" after the phase change must be taken into account in the geometry of the container and of the mixing tool present therein for avoiding dead zones. However, this has no influence on the efficiency of the process according to the invention. Since the rotor-stator systems used according to the invention have a more (Ystral) or less (Becomix) pronounced self-aspirating effect, flow through the shear zone is achieved even after the phase change and complete conversion is ensured.

The exact design of the rotor-stator system may be entirely different depending on the manufacturer and performance spectrum.

Figure 4:
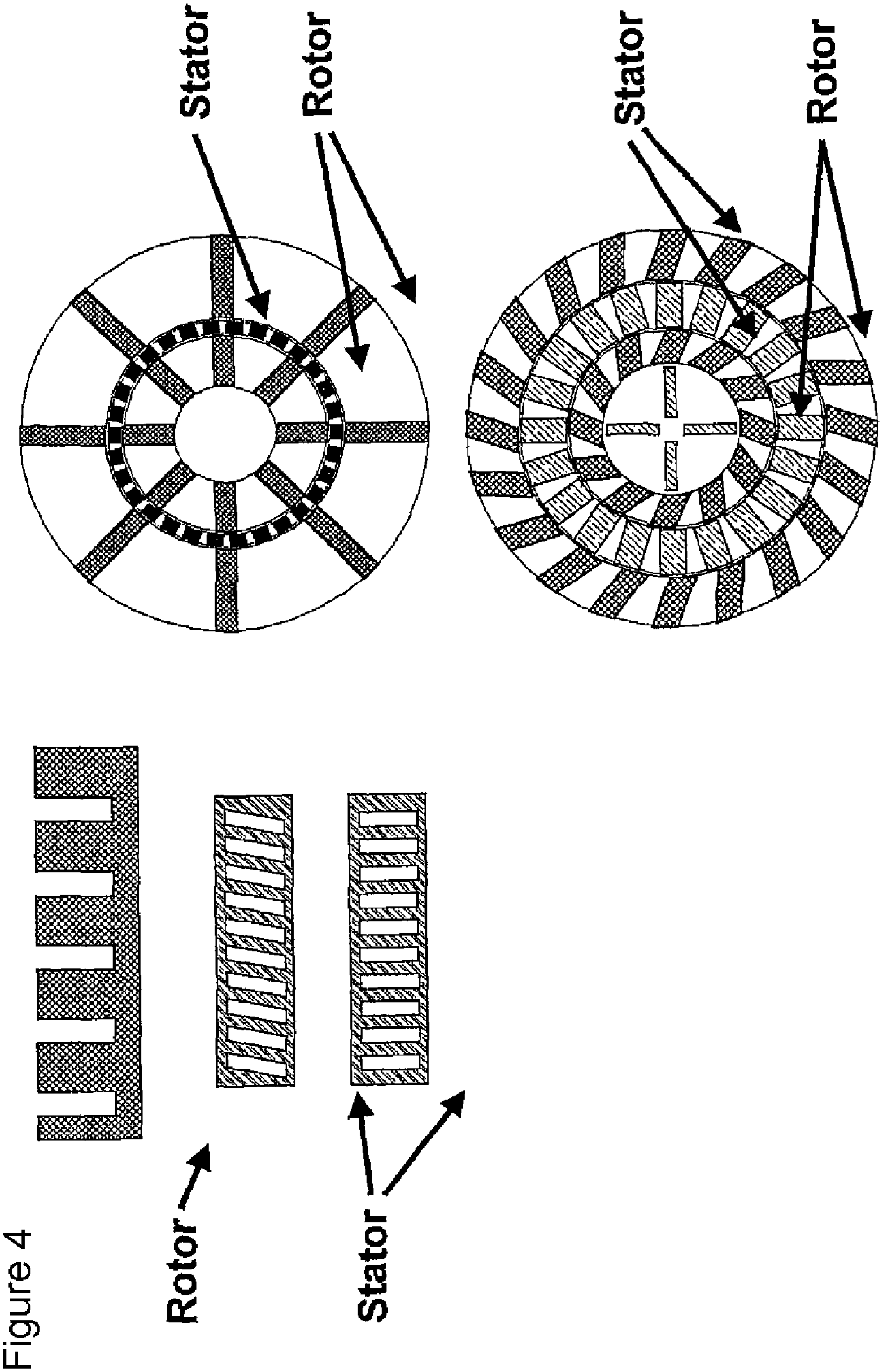

Some selected possibilities for the design of the rotor-stator system are shown schematically in FIG. 4.

These may entail a different number of rotors and stators and the detailed design may be absolutely different from manufacturer to manufacturer.

Example 3

Dry liquids are prepared using the process according to the invention:

The individual conditions are mentioned in Table 1.

TABLE 1

| | | Example: High-intensity stirrer | | Example: Rotor-stator make A | |
|---|---|---|---|---|---|
| Particle size distribution | D10% | 103 | 114 | 104 | 103 |
| (cumulative undersize) | D50% | 158 | 184 | 152 | 150 |
| | D90% | 236 | 315 | 233 | 210 |
| Bulk density DIN 53912 [kg/m$^3$] | | 471 | 493 | 465 | 460 |
| Tamped density DIN ISO 787 [kg/m$^3$] | | 558 | 567 | 552 | 449 |
| Solids content DIN 53198 [%] | | 4.9 | 4.9 | 5.0 | 4.7 |
| Circumferential velocity [m/s] | | 32 | 38.5 | 30.6 | 30.96 |
| Liquid component | | water | water | water | water + additive |

Figure 5:
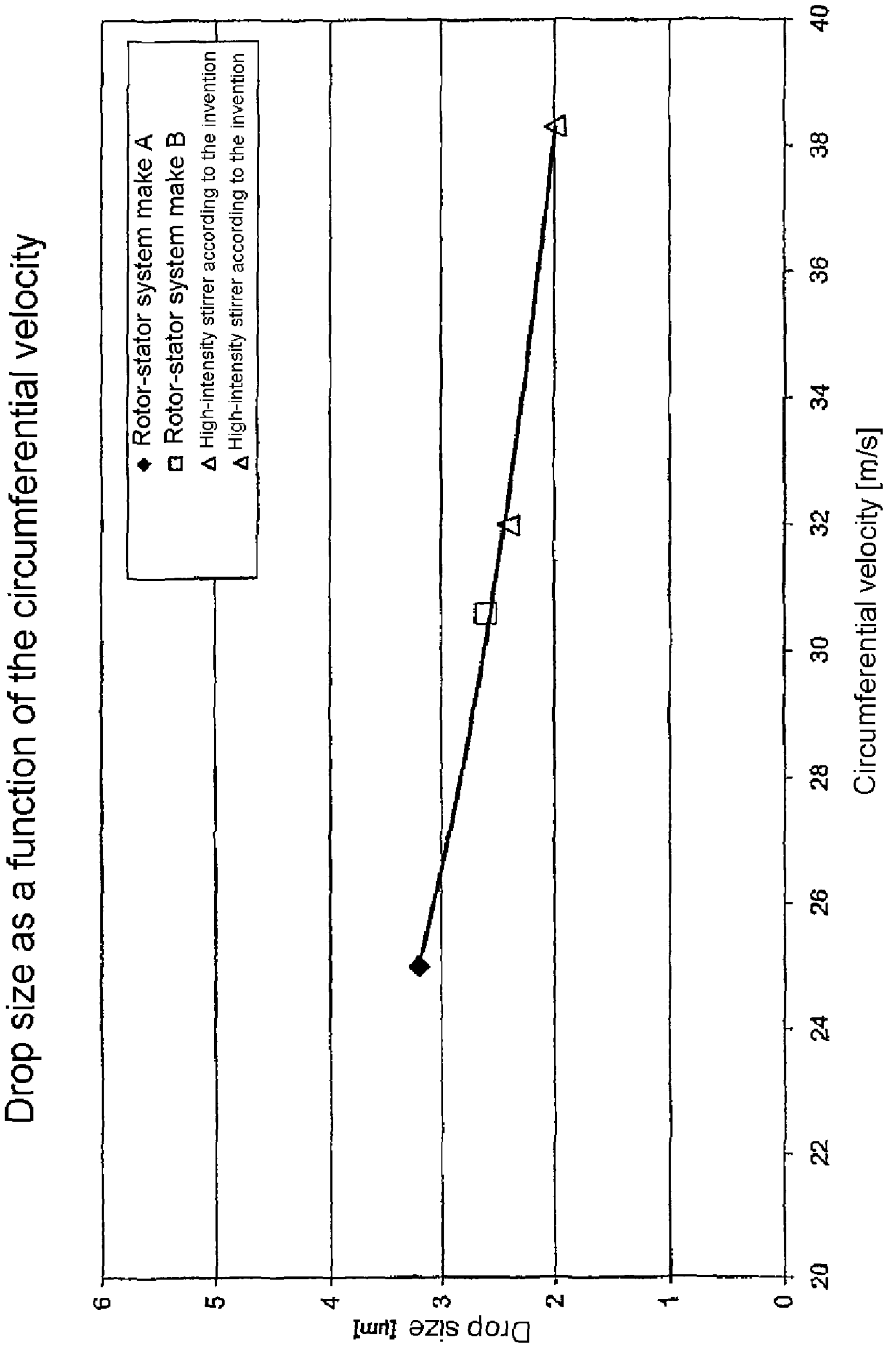

The dependence of the drop size on the circumferential velocity is shown graphically in FIG. 5.

The particle size distribution is carried out by means of TEM analysis on the freeze-dried (cryoprepared) dry liquid.

The cryopreparation is effected as follows.

In the cryopreparation, the cryopreparation chamber is first cooled with liquid nitrogen to about 100 K. When the preparation chamber is opened, a heater vaporizes $N_2$ so that the preparation takes place in a dry $N_2$ atmosphere. The preparation holder is likewise cooled to about 100 K by introducing liquid $N_2$ into the dewar of the holder.

For preparation 1 "dry water" was dusted onto a preparation support net coated with a thin polymer layer and was placed on a piece of filter paper in the preparation chamber cooled to low temperature and was frozen.

For preparation 2, ethane was liquefied in a copper container. A small net dusted with "dry water" was dipped into the ethane. Owing to the higher heat capacity of the liquefied ethane, water is frozen abruptly here, as a rule in amorphous form, in contrast to preparation 1. The sample can no longer change on cooling, in contrast to preparation 1.

The frozen preparations were then transferred to the preparation holder and transferred to the transmission electron microscope. Because the holder is cooled to a low temperature, the preparations can be analysed in a frozen state in the TEM.

The invention claimed is:

1. A process for producing a dry liquid containing a droplet surrounded by a hydrophobic, pyrogenically prepared silica, which comprises stirring, in a container, the hydrophobic, pyrogenically prepared silica to be passed through a clearly defined, spatially limited shear zone of a rotor stator to avoid or suppress formation of dead zones, wherein the rotor stator has a circumferential velocity of 25 m/s or more, passing a liquid and the hydrophobic, pyrogenically prepared silica from the container through the clearly defined, spatially limited shear zone axially, wherein passage through the clearly defined, spatially limited shear zone results in the liquid being broken up into small droplets surrounded by the hydrophobic, pyrogenically prepared silica, and removing the small droplets from the clearly defined, spatially limited shear zone radially to give the dry liquid having a particle size distribution (cumulative undersize) as follows:

| | |
|---|---|
| D10% | 80 to 140 μm |
| D50% | 140 to 200 μm |
| D90% | 190 to 340 μm |
| Bulk density DIN 53912 kg/m$^3$ | 400 to 500 |
| Tamped density DIN ISO 787 kg/m$^3$ | 500 to 600 |
| Solids content DIN 53 198% | 4 to 10. |

2. The process according to claim 1, wherein the rotor-stator mixer is located at the bottom of the container.

3. The process according to claim 1, wherein the rotor-stator mixer has a circumferential velocity ranging from 25 m/s to 31 m/s.

4. The process according to claim 1, wherein the stirring is performed with an anchor stirrer.

5. The process according to claim 1, wherein the hydrophobic, pyrogenically prepared silica is a fumed silica treated with hexamethyldisilazane.

6. The process according to claim 1, which further comprises recirculating the dry liquid into the clearly defined, spatially limited shear zone axially.

7. The process according to claim 1, wherein the hydrophobic, pyrogenically prepared silica and the liquid are stirred together in the container.

8. A method for producing multiple batches of a dry liquid containing a droplet surrounded by a hydrophobic, pyrogenically prepared silica, said method comprises producing each batch by a process which comprises stirring, in a container, the hydrophobic, pyrogenically prepared silica to be passed through a clearly defined, spatially limited shear zone of a rotor stator to avoid or suppress formation of dead zones, passing a liquid and the hydrophobic, pyrogenically prepared silica from the container through the clearly defined, spatially limited shear zone axially, wherein passage through the clearly defined, spatially limited shear zone results in the liquid being broken up into small droplets surrounded by the hydrophobic, pyrogenically prepared silica, and removing the small droplets from the clearly defined, spatially limited shear zone radially, wherein, independent of batch size, container volume, and container geometry, the dry liquid of the multiple batches have a particle size distribution (cumulative undersize) as follows:

| | |
|---|---|
| D10% | 80 to 140 μm |
| D50% | 140 to 200 μm |
| D90% | 190 to 340 μm |
| Bulk density DIN 53912 kg/m$^3$ | 400 to 500 |
| Tamped density DIN ISO 787 kg/m$^3$ | 500 to 600 |
| Solids content DIN 53 198% | 4 to 10, |

wherein the rotor stator has a circumferential velocity of 25 m/s or more.

* * * * *